(12) United States Patent
Liu

(10) Patent No.: US 8,385,151 B2
(45) Date of Patent: Feb. 26, 2013

(54) REVERSE TIME MIGRATION WITH ABSORBING AND RANDOM BOUNDARIES

(75) Inventor: Wei Liu, San Ramon, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 365 days.

(21) Appl. No.: 12/822,872

(22) Filed: Jun. 24, 2010

(65) Prior Publication Data
US 2011/0317519 A1    Dec. 29, 2011

(51) Int. Cl.
*G01V 1/00* (2006.01)
(52) U.S. Cl. .................................................. 367/50
(58) Field of Classification Search ............... 367/50–54
See application file for complete search history.

(56) References Cited

U.S. PATENT DOCUMENTS

| | | | |
|---|---|---|---|
| 2010/0054082 A1* | 3/2010 | McGarry et al. | 367/53 |
| 2010/0118651 A1 | 5/2010 | Liu et al. | |
| 2011/0276320 A1* | 11/2011 | Krebs et al. | 703/6 |
| 2011/0310699 A1* | 12/2011 | Robertsson et al. | 367/21 |

OTHER PUBLICATIONS

Clapp, Robert, 2009, Reverse time migration with random boundaries, 2009 SEG Expanded abstracts.

* cited by examiner

*Primary Examiner* — Cassie Galt
(74) *Attorney, Agent, or Firm* — Marie L. Clapp

(57) ABSTRACT

Images relating to a subsurface region may be generated based at least in part on a backward propagated source wavefield and a receiver wavefield. A source wavefield may be propagated from an initial wavefield-state forward in time, from an initial time-state to a final time-state, through an earth model associated with the subsurface region. The backward propagated source wavefield may be determined by propagating the source wavefield backward in time, from the final time-state to the initial time-state, through the earth model to reconstruct the initial wavefield-state. The receiver wavefield may be propagated, from the final time-state, through the earth model. The earth model may include at least one boundary region that can be defined as having one or more of absorbing characteristics, boosting characteristics, randomly perturbed characteristics, and/or other characteristics. As such, wavefields may be dampened, amplified, randomly scattered, and/or otherwise altered at the at least one boundary region. These wavefields may be used for constructing images of subsurface regions with improved signal-to-noise ratios.

16 Claims, 4 Drawing Sheets

REVERSE TIME MIGRATION WITH ABSORBING AND RANDOM BOUNDARIES

FIELD OF THE INVENTION

The invention relates to reverse time migration of wavefields in an earth model associated with a subsurface region, wherein the earth model can include at least one boundary region defined as having both absorbing characteristics and randomly perturbed characteristics.

BACKGROUND OF THE INVENTION

Reverse time migration is widely accepted as a preferred imaging technique for exploration and production in geological volumes, particularly those having complex structures. Despite its computational costs, reverse time migration is increasingly affordable due, for example, to optimization to numerical solvers and use of computer clusters. In recent years, the availability of co-processors such as GPUs and FPGAs has provided additional promise to significantly improve reverse time migration efficiency. In conventional approaches, however, using saved source wavefields and/or boundary values at each time step while performing reverse time migration is still a limiting factor in fully taking advantage of the computation power offered by co-processors.

SUMMARY

One aspect of the invention relates to a computer-implemented method for generating images relating to a subsurface region. The method may include propagating a source wavefield from an initial wavefield-state forward in time, from an initial time-state to a final time-state, through an earth model associated with the subsurface region. For propagating the source wavefield, the earth model may include at least one boundary region defined as having both absorbing characteristics and randomly perturbed characteristics such that the source wavefield is dampened and randomly scattered responsive to the source wavefield impinging on the at least one boundary region. The method may include determining a backward propagated source wavefield by propagating the source wavefield backward in time, from the final time-state to the initial time-state, through the earth model to reconstruct the initial wavefield-state. For determining the backward propagated source wavefield, the at least one boundary region may be redefined as having both boosting characteristics and the same randomly perturbed characteristics such that the source wavefield is amplified at the at least one boundary region. The method may include propagating a receiver wavefield, from the final time-state, through the earth model. For propagating the receiver wavefield, the at least one boundary region may be redefined as having absorbing characteristics such that the receiver wavefield is dampened responsive to the receiver wavefield impinging on the at the at least one boundary region. The method may include generating an image relating to the subsurface region based at least in part on the backward propagated source wavefield and the receiver wavefield.

Another aspect of the invention relates to a system for generating images relating to a subsurface region. The system may include one or more processors configured to execute computer program modules. The computer program modules may include a forward-propagation module configured to propagate a source wavefield from an initial wavefield-state forward in time, from an initial time-state to a final time-state, through an earth model associated with the subsurface region. The earth model may include at least one boundary region defined as having both absorbing characteristics and randomly perturbed characteristics such that the source wavefield is dampened and randomly scattered responsive to the source wavefield impinging on the at least one boundary region. The computer program modules may include a backward-propagation module configured to determine a backward propagated source wavefield by propagating the source wavefield backward in time, from the final time-state to the initial time-state, through the earth model to reconstruct the initial wavefield-state. For determination of the backward propagated source wavefield, the at least one boundary region may be redefined as having both boosting characteristics and the same randomly perturbed characteristics such that the source wavefield is amplified at the at least one boundary region. The computer program modules may include a receiver-wavefield-propagation module configured to propagate a receiver wavefield, from the final time-state, through the earth model. For propagation of the receiver wavefield, the at least one boundary region may be redefined as having absorbing characteristics such that the receiver wavefield is dampened responsive to the receiver wavefield impinging on the at the at least one boundary region. The computer program modules may include an imaging module configured to generate an image relating to the subsurface region based at least in part on the backward propagated source wavefield and the receiver wavefield.

Yet another aspect of the invention relates to a computer readable storage medium have instructions embodied thereon. The instructions may be executable by a processor to perform a method for generating images relating to a subsurface region. The method may include propagating a source wavefield from an initial wavefield-state forward in time, from an initial time-state to a final time-state, through an earth model associated with the subsurface region. For propagating the source wavefield, the earth model may include at least one boundary region defined as having both absorbing characteristics and randomly perturbed characteristics such that the source wavefield is dampened and randomly scattered responsive to the source wavefield impinging on the at least one boundary region. The method may include determining a backward propagated source wavefield by propagating the source wavefield backward in time, from the final time-state to the initial time-state, through the earth model to reconstruct the initial wavefield-state. For determining the backward propagated source wavefield, the at least one boundary region may be redefined as having both boosting characteristics and the same randomly perturbed characteristics such that the source wavefield is amplified at the at least one boundary region. The method may include propagating a receiver wavefield, from the final time-state, through the earth model. For propagating the receiver wavefield, the at least one boundary region may be redefined as having absorbing characteristics such that the receiver wavefield is dampened responsive to the receiver wavefield impinging on the at the at least one boundary region. The method may include generating an image relating to the subsurface region based at least in part on the backward propagated source wavefield and the receiver wavefield.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
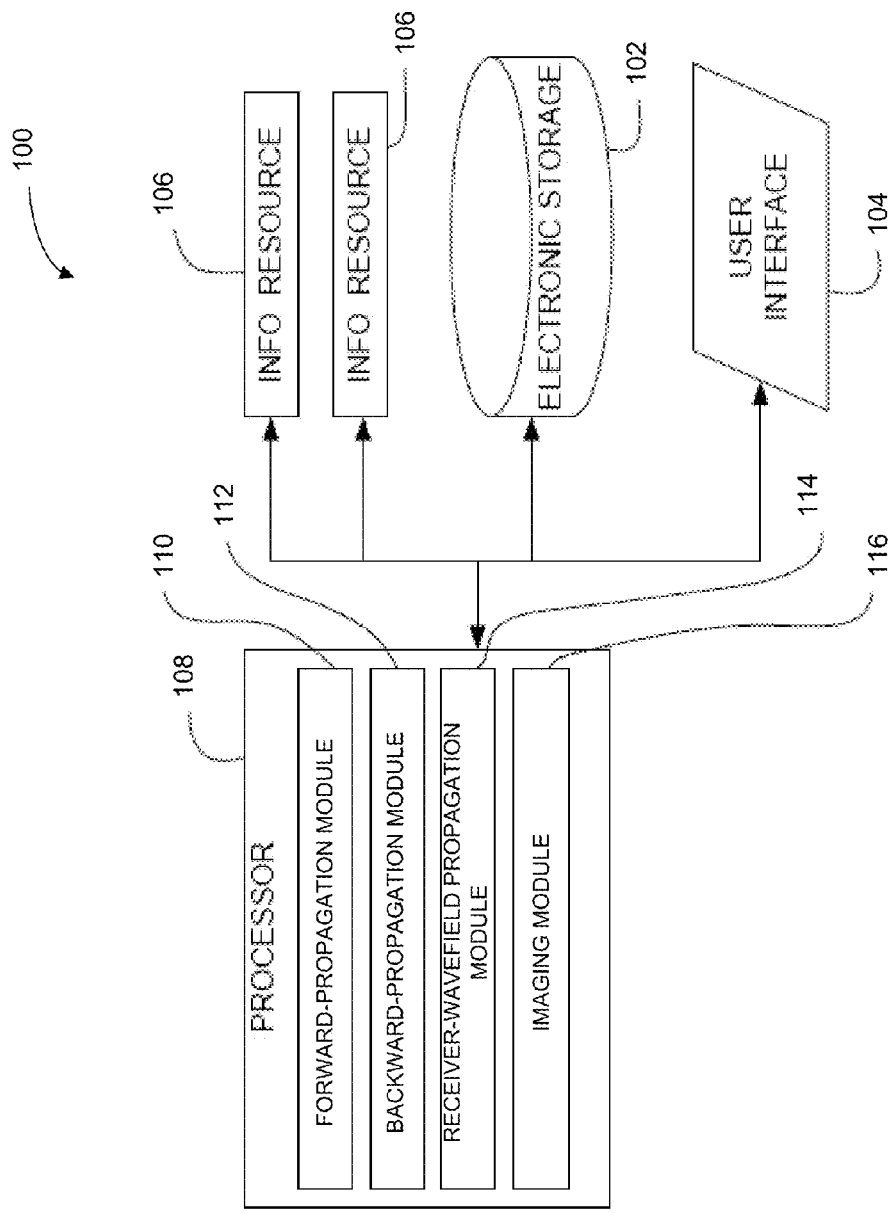
FIG. 1 illustrates a system configured to generate images relating to a subsurface region, in accordance with one or more embodiments of the invention.

FIG. 1 illustrates a system 100 configured to generate images relating to a subsurface region, in accordance with one or more embodiments of the invention. Exemplary embodiments provide new ways to largely reduce and/or remove storage access. This is achieved by using absorbing, boosting, and/or random boundary conditions in earth models to retain and later restore source wavefields in the computation domain. In contrast with conventional approaches, these boundary conditions may be used to reduce artifacts in artificially reflected wavefields while useful signals are recovered in amplitude for imaging. Furthermore, checkpoints in time may be used to refresh wavefield states and remove accumulated numerical errors. As such, embodiments of the present invention can achieve improved signal-to-noise ratios as well as improved image quality. In one embodiment, the system 100 comprises electronic storage 102, a user interface 104, one or more information resources 106, one or more processors 108, and/or other components.

In one embodiment, the electronic storage 102 comprises electronic storage media that electronically stores information. The electronic storage media of the electronic storage 102 may include system storage that is provided integrally (i.e., substantially non-removable) with the system 100 and/or removable storage that is removably connectable to the system 100 via, for example, a port (e.g., a USB port, a firewire port, etc.) or a drive (e.g., a disk drive, etc.). The electronic storage 102 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 102 may store software algorithms, information determined by the processor 108, information received via the user interface 104, information received from the information resources 106, and/or other information that enables the system 100 to function as described herein. The electronic storage 102 may be a separate component within the system 100, or the electronic storage 102 may be provided integrally with one or more other components of the system 100 (e.g., the processor 108).

The user interface 104 is configured to provide an interface between the system 100 and a user through which the user may provide information to and receive information from the system 100. This enables data, results, and/or instructions and any other communicable items, collectively referred to as "information," to be communicated between the user and the system 100. As used herein, the term "user" may refer to a single individual or a group of individuals who may be working in coordination. Examples of interface devices suitable for inclusion in the user interface 104 include one or more of a keypad, buttons, switches, a keyboard, knobs, levers, a display screen, a touch screen, speakers, a microphone, an indicator light, an audible alarm, and/or a printer. In one embodiment, the user interface 104 actually includes a plurality of separate interfaces.

It is to be understood that other communication techniques, either hard-wired or wireless, are also contemplated by the present invention as the user interface 104. For example, the present invention contemplates that the user interface 104 may be integrated with a removable storage interface provided by the electronic storage 102. In this example, information may be loaded into the system 100 from removable storage (e.g., a smart card, a flash drive, a removable disk, etc.) that enables the user to customize the implementation of the system 100. Other exemplary input devices and techniques adapted for use with the system 100 as the user interface 104 include, but are not limited to, an RS-232 port, RF link, an IR link, modem (telephone, cable or other). In short, any technique for communicating information with the system 100 is contemplated by the present invention as the user interface 104.

The information resources 106 include one or more sources of information related to a subsurface geological volume of interest, the process of generating an earth model of the subsurface geological volume of interest, an actual earth model of the subsurface geological volume of interest, and/or other information relating to the subsurface geological volume of interest. By way of non-limiting example, one of information resources 106 may include seismic data acquired at or near the subsurface volume of interest, information derived therefrom, and/or information related to the acquisition. Such seismic data may include source wavefields and receiver wavefields. The seismic data may include individual traces of seismic data. A trace of seismic data includes the data recorded at one detector representing seismic energy propagating through the subsurface volume of interest from a source. The information derived from the seismic data may include, for example, a velocity model, beam properties associated with beams used to model the propagation of seismic energy through the subsurface volume of interest, Green's functions associated with beams used to model the propagation of seismic energy through the subsurface volume of interest, and/or other information. Information related to the acquisition of seismic data may include, for example, data related to the position and/or orientation of a source of seismic energy, the positions and/or orientations of one or more detectors of seismic energy, the time at which energy was generated by the source and directed into the subsurface volume of interest, and/or other information. An earth model of a subsurface volume of interest can represent various characteristics of that volume of interest such as spatial structure and compositional properties. The earth model may describe interfaces between regions having different compositions and/or region displaying different velocities of seismic energy propagation.

The processor 108 is configured to provide information processing capabilities in the system 100. As such, the processor 108 may include one or more of a digital processor, an analog processor, a digital circuit designed to process information, an analog circuit designed to process information, a state machine, and/or other mechanisms for electronically processing information. Although the processor 108 is shown in FIG. 1 as a single entity, this is for illustrative purposes only. In some implementations, the processor 108 may include a plurality of processing units. These processing units may be physically located within the same device or computing platform, or the processor 108 may represent processing functionality of a plurality of devices operating in coordination.

As is shown in FIG. 1, the processor 108 may be configured to execute one or more computer program modules. The one or more computer program modules may include one or more of a forward-propagation module 110, a backward-propagation module 112, a receiver-wavefield-propagation module 114, an imaging module 116, and/or other modules. The processor 108 may be configured to execute modules 110, 112, 114, and/or 116 by software; hardware; firmware; some combination of software, hardware, and/or firmware; and/or other mechanisms for configuring processing capabilities on the processor 108.

It should be appreciated that although the modules 110, 112, 114, and 116 are illustrated in FIG. 1 as being co-located within a single processing unit, in implementations in which the processor 108 includes multiple processing units, one or more of the modules 110, 112, 114, and/or 116 may be located remotely from the other modules. The description of the functionality provided by the different modules 110, 112, 114, and/or 116 described below is for illustrative purposes, and is not intended to be limiting, as any of the modules 110, 112, 114, and/or 116 may provide more or less functionality than is described. For example, one or more of the modules 110, 112, 114, and/or 116 may be eliminated, and some or all of its functionality may be provided by other ones of the modules 110, 112, 114, and/or 116. As another example, the processor 108 may be configured to execute one or more additional modules that may perform some or all of the functionality attributed below to one of the modules 110, 112, 114, and/or 116.

The forward-propagation module 110 may be configured to propagate a source wavefield from an initial wavefield-state forward in time through an earth model associated with a subsurface region. This includes propagating the source wavefield from an initial time-state, when the initial wavefield-state is present, to a final time-state. The subsurface region associated with the earth model is a finite region. That is, the subsurface region may include a finite volume for three-dimensional implementations, a finite area for two-dimensional implementations, or some other finite region for other implementations. As such, the earth model is encompassed by boundaries. Generally speaking, when a boundary of an earth model is merely represented as an abrupt edge, the boundary will act as a reflector for wavefields propagating in that earth model. Reflections from boundaries of an earth model are considered artificial in that they do not accurately portray actual wavefield behavior in the subsurface region. In order to reduce the presence of artificial reflections of propagating wavefields in the earth model, the earth model may include one or more boundary regions having different conditions or characteristics relative to the rest of the earth model that affect wavefield propagation properties. A boundary region may include a single line along a boundary of the earth model, or an area along a boundary of the earth model. The earth model may include at least one boundary region defined as having absorbing characteristics and/or randomly perturbed characteristics. As such, the source wavefield may be dampened and/or randomly scattered at the at least one boundary region responsive to the source wavefield impinging on the at least one boundary region.

According to exemplary embodiments, the absorbing characteristics may include an attenuation function. Generally speaking, an attenuation function includes any function that will cause the amplitude of a wavefield to decrease over a specified spatial range (e.g., a span of a boundary region). Such an attenuation function at a boundary region of an earth model will effectively cause a wavefield to be partially or fully absorbed at the boundary region when the wavefield impinges that boundary region. Absorbing characteristics at a boundary region allow reflections of a wavefield by the boundary region to be reduced or eliminated. Ultimately, reducing or eliminating such reflections will reduce artifacts in an image of the subsurface region. According to some embodiments, during forward propagation of source wavefields, absorbing characteristics of a boundary region may be configured such that amplitudes of boundary reflections are reduced, rather than eliminated, since those events may later be used for reconstructing initial wavefield states. However, during backward propagation of receiver wavefields, stronger attenuation at a boundary region may be applied in order to eliminate (or reduce as much as possible) boundary reflections of receiver wavefields.

The randomly perturbed characteristics may include random velocities attributed to various areas of a boundary region and/or other properties that cause a wavefield to be scattered at the boundary regions upon impinging the boundary region, in accordance with various embodiments. As such, reflections that do survive in the earth model, even in the presence of attenuating boundary regions, will be distorted. The distorted reflections will not contribute to coherent, recognizable image events.

In exemplary embodiments, the forward-propagation module 110 may be further configured to save or otherwise retain one or more wavefield-states while propagating the source wavefield from the initial time-state to the final time-state. The retained wavefield-states may be save by and retrieved from the electronic storage 102. Saving or otherwise retaining wavefield-states during forward propagation of a wavefield may allow numerical errors to be reduced and/or eliminated during backward propagation of that wavefield, as discussed further in connection with the backward-propagation module 112.

The backward-propagation module 112 may be configured to determine a backward propagated source wavefield. In exemplary embodiments, the backward propagated source wavefield may be determined by propagating the source wavefield backward in time, from the final time-state to the initial time-state, through the earth model to reconstruct the initial wavefield-state. For backward propagation, the at least one boundary region of the earth model may be defined as having both boosting characteristics—rather than attenuating characteristics—and the same randomly perturbed characteristics as for forward propagation as described in connection with the forward-propagation module 110. As such, the source wavefield is amplified at the at least one boundary region during backward propagation. In exemplary embodiments, the boosting characteristics are equal to the inverse of the absorbing characteristics used during forward propagation.

In some embodiments, the backward-propagation module 112 may be further configured to utilize wavefield-states retained during forward propagation while determining the backward propagated source wavefield. Such retained wavefield-states may be retrieved from the electronic storage 102 by the backward-propagation module 112. The retained wave-field states may serve to reduce numerical errors (e.g., round-off errors) in the backward propagated source wavefield.

The receiver-wavefield-propagation module 114 may be configured to propagate a receiver wavefield, from the final time-state, through the earth model. For propagation of the receiver wavefield, the at least one boundary region of the earth model may be defined as having absorbing characteristics such that the receiver wavefield is dampened at the at least one boundary region responsive to the receiver wavefield impinging on the at least one boundary region. In some embodiments, the receiver-wavefield-propagation module 114 may be configured to propagate the receiver wavefield concurrently with determination by the backward-propagation module 112 of the backward propagated source wavefield.

The imaging module 116 may be configured to generate an image relating to the subsurface region based at least in part on the backward propagated source wavefield and the receiver wavefield. According to exemplary embodiments the imaging module 116 may be configured to cross-correlate the backward propagated source wavefield determined by the backward-propagation module 112 with the receiver wavefield to generating the image. Other image generation techniques based on the backward propagated source wavefield and the receiver wavefield are also contemplated and are within the scope of the present invention.

Figure 2:
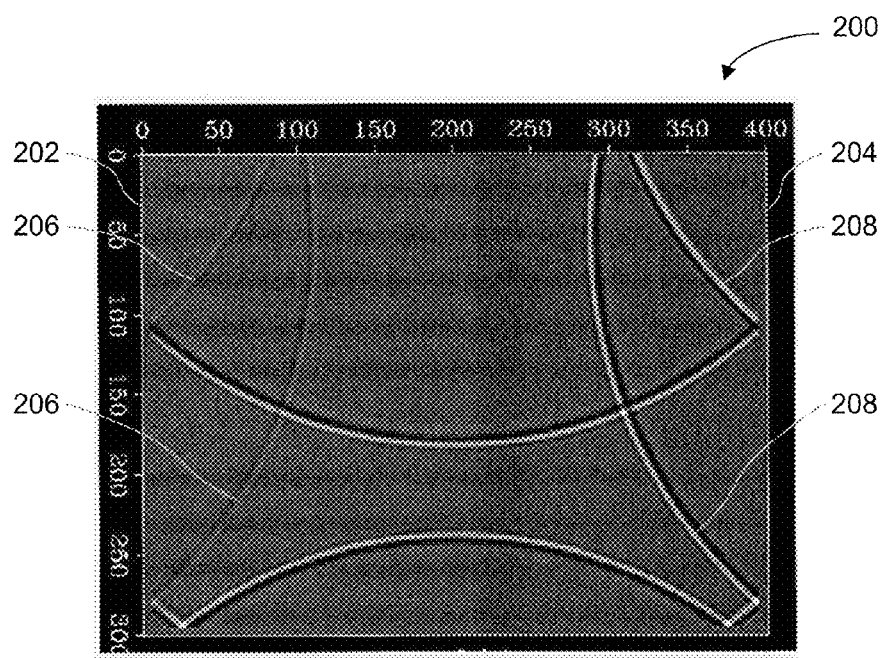
FIG. 2 illustrates an exemplary wavefield state during forward propagation in an earth model in which an absorbing boundary is defined.
Figure 3:
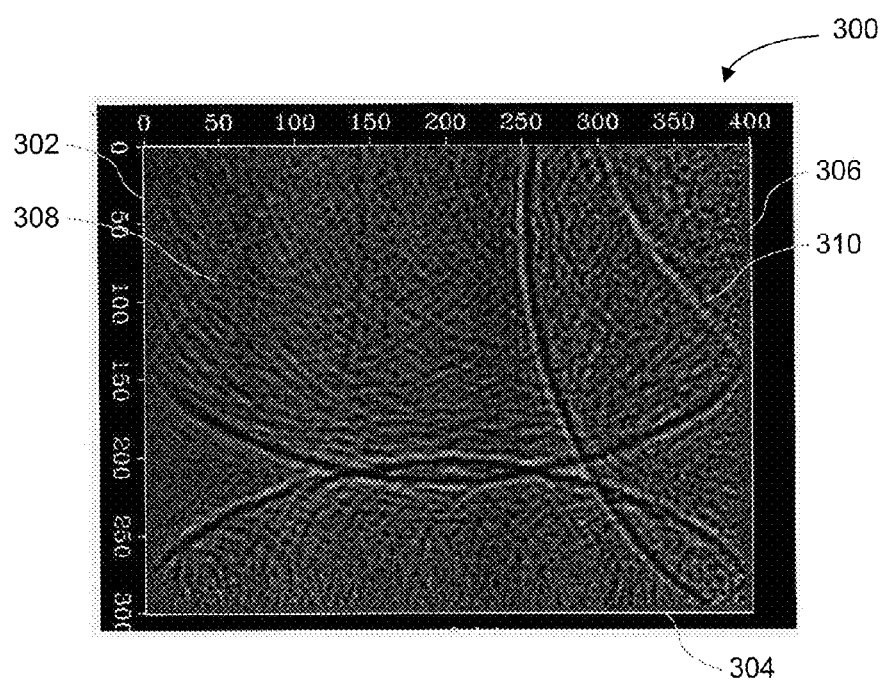
FIG. 3 illustrates an exemplary wavefield state during forward propagation in an earth model in which random boundaries and an absorbing boundary are defined.

FIGS. 2 and 3 contrast exemplary effects of absorbing characteristics, non-absorbing characteristics, randomly perturbed characteristics, and non-randomly perturbed characteristics attributed to boundaries in an earth model at various stages of forward wavefield propagation. FIG. 2, for instance, illustrates an exemplary wavefield state during forward propagation (in this example, forward propagation generally corresponds to the downward direction) in an earth model 200 in which an absorbing boundary is defined. More specifically, in FIG. 2, the left boundary 202 of the earth model 200 is defined as having absorbing characteristics, whereas the right boundary 204 is not. As such, reflections 206 from the left boundary 202 have decreased amplitude relative to reflections 208 from the right boundary 204.

FIG. 3 illustrates an exemplary wavefield state during forward propagation (in this example, forward propagation generally corresponds to the downward direction) in an earth model 300 in which random boundaries and an absorbing boundary are defined. More specifically, the left boundary 302, the lower boundary 304, and the right boundary 306 of the earth model 300 are defined as having randomly perturbed characteristics. The left boundary 302 is also defined as having absorbing characteristics. Reflections in the earth model 300 such as reflection 308 from the left boundary 302 and reflection 310 from the right boundary 306 are randomly distorted due to the randomly perturbed characteristics. The amplitude of the reflection 308, however, is markedly weakened relative to the reflection 310 due to the absorbing characteristics attributed to the left boundary 302. Such distortion combined with attenuation may provide improved image quality compared to conventional approaches.

Figure 4:
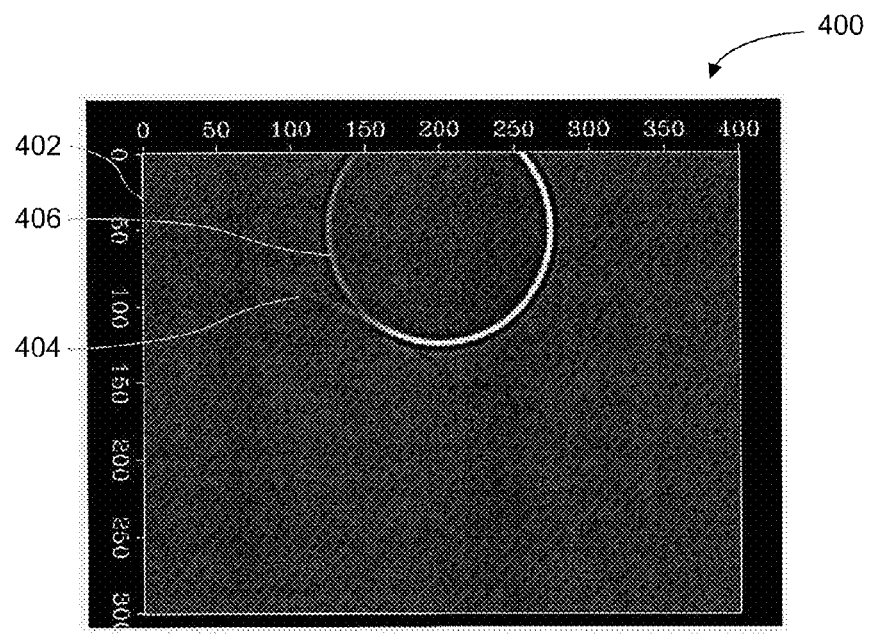
FIG. 4 illustrates an exemplary reconstructed wavefield in an earth model in which boosting boundaries are not defined.
Figure 5:
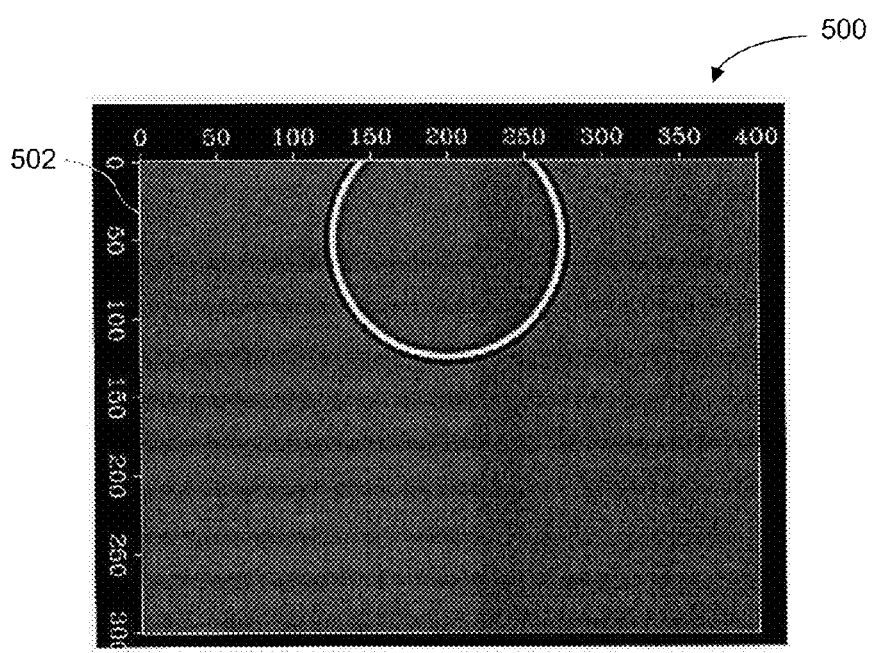
FIG. 5 illustrates an exemplary reconstructed wavefield in an earth model in which a boosting boundary is defined.

FIGS. 4 and 5 contrast exemplary effects of boosting characteristics and non-boosting characteristic attributed to boundaries in an earth model during backward propagation. More specifically, FIG. 4 illustrates an exemplary reconstructed wavefield in an earth model 400 in which boosting boundaries are not defined. During forward propagation (in this example, backward propagation generally corresponds to the upward direction) of the wavefield in the earth model 400, absorbing characteristics were attributed only to the left boundary 402, however no boosting characteristics were attributed to the left boundary 402 during backward propagation. As a result, artifacts 404 as well as amplitude loss 406 in portions of the reconstructed wavefield can be seen in the earth model 400.

FIG. 5 illustrates an exemplary reconstructed wavefield in an earth model 500 in which a boosting boundary is defined. During forward propagation of the wavefield in the earth model 500, absorbing characteristics were attributed to the left boundary 502, and boosting characteristics were attributed to the left boundary 502 during backward propagation (in this example, backward propagation generally corresponds to the upward direction). Relative to the reconstructed wavefield illustrated in FIG. 4, the reconstructed wavefield of FIG. 5 lacks appreciable artifacts and amplitude loss.

Figure 6:
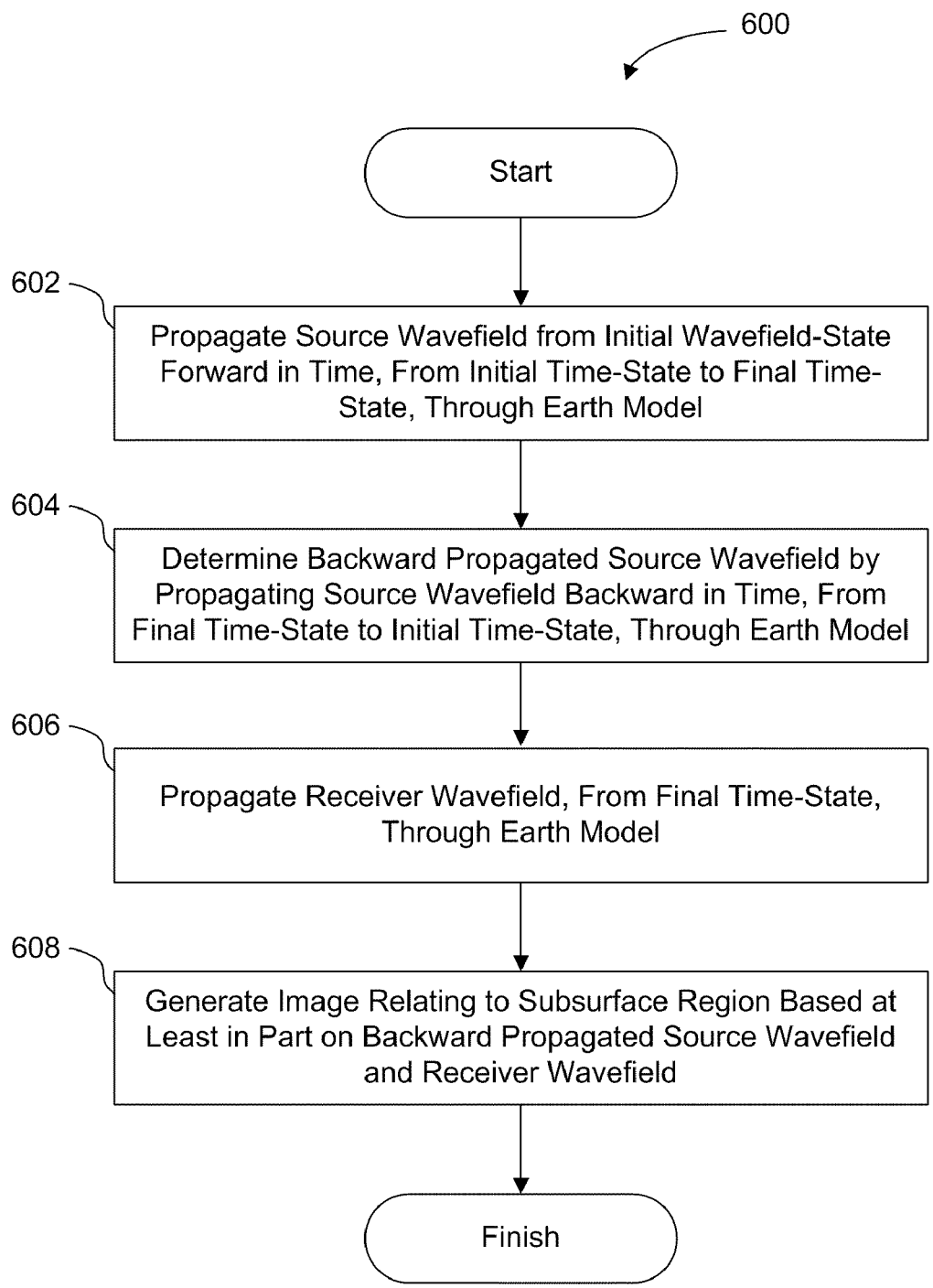
FIG. 6 illustrates a method for generating images relating to a subsurface region, in accordance with one or more embodiments of the invention.

FIG. 6 illustrates a method 600 for generating images relating to a subsurface region, in accordance with one or more embodiments of the invention. The operations of the method 600 presented below are intended to be illustrative. In some embodiments, the method 600 may be accomplished with one or more additional operations not described, and/or without one or more of the operations discussed. Additionally, the order in which the operations of the method 600 are illustrated in FIG. 6 and described below is not intended to be limiting.

In some embodiments, the method 600 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of the method 600 in response to instructions stored electronically on an electronic storage medium. The one or more processing devices may include one or more devices configured through hardware, firmware, and/or software to be specifically designed for execution of one or more of the operations of the method 600.

At an operation 602, a source wavefield is propagated from an initial wavefield-state forward in time, from an initial time-state to a final time-state, through an earth model associated with the subsurface region. The earth model may include at least one boundary region defined as having both absorbing characteristics and randomly perturbed characteristics such that the source wavefield is dampened and randomly scattered responsive to the source wavefield impinging on the at least one boundary region. In exemplary embodiments, the operation 602 may be performed by the forward-propagation module 110.

At an operation 604, a backward propagated source wavefield is determined by propagating the source wavefield backward in time, from the final time-state to the initial time-state, through the earth model to reconstruct the initial wavefield-state. The at least one boundary region may be redefined as having both boosting characteristics and the same randomly perturbed characteristics as in the operation 602 such that the source wavefield is amplified at the at least one boundary region. The backward-propagation module 112 may be executed to perform the operation 604 in some embodiments.

At an operation 606, a receiver wavefield is propagated, from the final time-state, through the earth model. The at least one boundary region may be redefined as having absorbing characteristics such that the receiver wavefield is dampened at the at least one boundary region responsive to the receiver wavefield impinging on the at least one boundary region. According to some embodiments, the receiver-wavefield-propagation module 114 may be executed to perform the operation 606.

At an operation 608, an image relating to the subsurface region is generated based at least in part on the backward propagated source wavefield and the receiver wavefield. In some implementations, the backward propagated source wavefield and the receiver wavefield may be cross-correlated to generate the image. The imaging module 116 may be executed to perform the operation 608, in accordance with exemplary embodiments.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A computer-implemented method for generating images relating to a subsurface region, the method comprising:
   propagating, via a computer processor, a source wavefield from an initial wavefield-state forward in time, from an initial time-state to a final time-state, through an earth model associated with the subsurface region, wherein the earth model includes at least one boundary region defined as having both absorbing characteristics and randomly perturbed characteristics such that the source wavefield is dampened and randomly scattered responsive to the source wavefield impinging on the at least one boundary region;
   determining, via the computer processor, a backward propagated source wavefield by propagating the source wavefield backward in time, from the final time-state to the initial time-state, through the earth model to reconstruct the initial wavefield-state, wherein the at least one boundary region is redefined as having both boosting characteristics and the same randomly perturbed characteristics such that the source wavefield is amplified at the at least one boundary region;
   propagating, via the computer processor, a receiver wavefield, from the final time-state, through the earth model, wherein the at least one boundary region is redefined as having absorbing characteristics such that the receiver wavefield is dampened responsive to the receiver wavefield impinging on the at the at least one boundary region; and
   generating, via the computer processor, an image relating to the subsurface region based at least in part on the backward propagated source wavefield and the receiver wavefield.

2. The method of claim 1, wherein propagating the receiver wavefield is performed concurrently with determining the backward propagated source wavefield.

3. The method of claim 1, further comprising retaining one or more wavefield-states while propagating the source wavefield from the initial time-state to the final time-state.

4. The method of claim 3, further comprising utilizing the retained one or more wavefield-states while determining the backward propagated source wavefield to reduce numerical errors.

5. The method of claim 1, wherein the absorbing characteristics include an attenuation function.

6. The method of claim 1, wherein the boosting characteristics are equal to the inverse of the absorbing characteristics.

7. The method of claim 1, wherein the randomly perturbed characteristics include random velocities.

8. The method of claim 1, wherein generating the image includes cross-correlating the backward propagated source wavefield and the receiver wavefield.

9. A system for generating images relating to a subsurface region, the system comprising:
   one or more processors configured to execute computer program modules, the computer program modules comprising:
   a forward-propagation module configured to propagate a source wavefield from an initial wavefield-state forward in time, from an initial time-state to a final time-state, through an earth model associated with the subsurface region, wherein the earth model includes at least one boundary region defined as having both absorbing characteristics and randomly perturbed characteristics such that the source wavefield is dampened and randomly scattered responsive to the source wavefield impinging on the at least one boundary region;
   a backward-propagation module configured to determine a backward propagated source wavefield by propagating the source wavefield backward in time, from the final time-state to the initial time-state, through the earth model to reconstruct the initial wavefield-state, wherein the at least one boundary region is redefined as having both boosting characteristics and the same randomly perturbed characteristics such that the source wavefield is amplified at the at least one boundary region;
   a receiver-wavefield-propagation module configured to propagate a receiver wavefield, from the final time-state, through the earth model, wherein the at least one boundary region is redefined as having absorbing characteristics such that the receiver wavefield is dampened responsive to the receiver wavefield impinging on the at the at least one boundary region; and
   an imaging module configured to generate an image relating to the subsurface region based at least in part on the backward propagated source wavefield and the receiver wavefield.

10. The system of claim 9, wherein the receiver-wavefield-propagation module is further configured to propagate the receiver wavefield concurrently with determination by the backward-propagation module of the backward propagated source wavefield.

11. The system of claim 9, wherein the forward-propagation module is further configured to retain one or more wavefield-states while propagating the source wavefield from the initial time-state to the final time-state.

12. The system of claim 11, wherein the backward-propagation module is further configured to utilize the retained one or more wavefield-states while determining the backward propagated source wavefield to reduce numerical errors.

13. The system of claim 9, wherein the absorbing characteristics include an attenuation function.

14. The system of claim 9, wherein the boosting characteristics are equal to the inverse of the absorbing characteristics.

15. The system of claim 9, wherein the randomly perturbed characteristics include random velocities.

16. The system of claim 9, wherein the imaging module is further configured to cross-correlate the backward propagated source wavefield and the receiver wavefield while generating the image.

* * * * *